United States Patent Office 2,998,468
Patented Aug. 29, 1961

2,998,468
METHOD OF PRESERVING NATURAL RUBBER BY ADDING THERETO 2:2:4-TRIMETHYL-DECAHYDROQUINOLINE AND A SUBSTITUTED PHENOL
Bertrand Ernest Wilde, Marchwiel, Wrexham, Wales, assignor to Monsanto Chemicals Limited, London, England, a British company
No Drawing. Original application Oct. 11, 1954, Ser. No. 461,679. Divided and this application Aug. 6, 1957, Ser. No. 680,611
Claims priority, application Great Britain Oct. 14, 1953
8 Claims. (Cl. 260—800)

This invention relates to a method for rendering rubber resistant to deterioration by incorporating therein one or more compounds as hereinafter described, at least one of those compounds being the new chemical compound 2:2:4-trimethyl-decahydroquinoline. The invention also relates to the resulting rubber products. This application is a division of my copending application Serial No. 461,679, filed October 11, 1954. That application is now U.S. Patent No. 2,831,861.

The new chemical compound is a derivative of quinoline and in particular of the compound 2:2:4-trimethyl-1:2-dihydroquinoline, which can itself be obtained by condensing acetone and aniline.

It has now been found that 2:2:4-trimethyl-1:1:2-dihydroquinoline can be reduced by direct hydrogenation to the compound 2:2:4-trimethyl-decahydroquinoline, which has not previously been described:

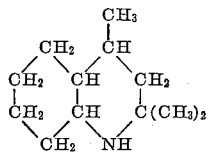

The new compound 2:2:4-trimethyl-decahydroquinoline has been found to be of particular value as an antioxidant for rubber, especially for use in white and other light-coloured compositions.

It is well known that vulcanised rubber is liable to deteriorate on exposure to the action of heat, light and oxygen-containing gases, and that deterioration occurs in the atmosphere under normal conditions of use. To resist this effect, various substances have been proposed for use in rubber as antioxidants, but many of these suffer from the disadvantage that they cause darkening with time and badly discolour the rubber stocks in which they are incorporated if these should be of a light colour. This problem does not arise with dark-coloured stocks obtained using carbon blacks, for instance, but it is a serious difficulty in such compositions as the white rubber stocks obtained using zinc oxide, titanium dioxide and analogous substances.

The discovery has now been made that 2:2:4-trimethyl-decahydroquinoline is an effective antioxidant for rubber, and moreover that it does not seriously discolour light-coloured rubber stocks, so that by its use the difficulties referred to above can be avoided. It should be mentioned that in determining the effect of rubber antioxidants there are two standard tests, the first being the action of oxygen under pressure on a vulcanized rubber prepared using the antioxidant (the so-called "oxygen bomb test") and the second the behaviour of the sample of vulcanized rubber on heating in a hot air oven (the "hot air oven test"). The antioxidant properties of the above new compound can be demonstrated by both these tests, as is seen from the examples given later in this specification.

The 2:2:4-trimethyl-decahydroquinoline may if desired be used in rubber in conjunction with other antioxidants, and by properly choosing the other antioxidant a good antioxidant effect can be obtained in this way without causing any undue discolouration of light-coloured stocks. Thus a mixture of 2:2:4-trimethyl-decahydroquinoline and a benzyl cresol may sometimes be preferable to the former alone. It is also possible to use the 2:2:4-trimethyl-decahydroquinoline in conjunction with other antioxidants such as a mono-ether of a dihydric phenol or a 2:4:6-trialkyl-phenol.

The benzyl cresols are cresols substituted in the nucleus by one or more benzyl groups, and they can be obtained by treating the cresols with benzylating agents such as benzyl chloride. In practice a suitable benzyl cresol for use in the above manner can be obtained by benzylating a commercial cresol containing a mixture of isomers (a so-called "cresylic acid") by means of benzyl chloride, preferably so as to introduce on an average above one benzyl group into each cresol molecule. The product will of course contain a mixture of mono-benzyl isomers, in addition to which a small proportion of molecules will be formed containing more than one benzyl group substituted into the nucleus and there will also be a small measure of reaction between the phenolic group and the benzyl chloride to form a benzyl ether. Furthermore, cresylic acids invariably contain a certain proportion of phenols other than the cresols. However, the product will be essentially a mixture of isomeric benzyl cresols and is eminently suitable for use as an antioxidant. Other compounds similar to the benzyl cresols can be used, for instance benzyl xylenols (and similar benzyl alkyl-phenols) and other benzyl phenols, and these can in general be obtained in an analogous manner.

If a mono-ether of a dihydric phenol is used as a rubber antioxidant in conjunction with the 2:2:4-trimethyl-decahydroquinoline it is preferably the mono-benzyl ether, though other ethers, for instance the mono-ethyl ether, are also suitable. In practice a mono-ether of a commercial mixture of dihydric phenols is best used, especially one containing a preponderance of catechol, and very good results have been obtained using the mono-ethers, particularly the mono-benzyl ether, of a commercial mixture of dihydric phenols containing about 90% by weight of catechol and methyl-substituted catechols. Other commercial mixtures containing more equal proportions of isomeric dihydric phenols can also be used in forming the ether.

If a 2:4:6-trialkyl phenol is used a 2:4-dimethyl-6-octyl phenol (especially one obtained by the reaction of 2:4-dimethyl phenol with diisobutylene) is very satisfactory, and other 2:4:6-trialkyl phenols which can be used are 2:6-dimethyl-4-octyl phenol (again one obtained from the dimethyl phenol and diisobutylene is very suitable) and 2:6-dibutyl-4-methyl phenol, in particular where the butyl group is tertiary butyl. It is, however, not necessary to use a pure 2:4:6-trialkyl phenol in preparing mixtures of the above kind, and for instance an alkylated commercial cresylic acid can be used in admixture with the 2:2:4-trimethyl-decahydroquinoline. Thus an octylated cresylic acid obtained by octylating the acid with diisobutylene can very suitably be used; such an octylated product might contain several isomeric 2:4:6-trialkyl-phenols along with other substances.

Where 2:2:4-trimethyl-decahydroquinoline is used as a rubber antioxidant in admixture with another antioxidant the proportions of the constituents of such mixtures can lie within wide limits. Good results can be obtained using mixtures containing 2:2:4-trimethyl-decahydroquinoline and a second antioxidant in proportions from 25:75 to 75:25 by weight, and also mixtures outside these limits. Very satisfactory results can be obtained using approximately equal proportions by weight of 2:2:4-trimethyl-decahydroquinoline and a benzyl cresol.

The quantity of the 2:2:4-trimethyl-decahydroquinoline or antioxidant mixture containing it used in the rubber stock will depend upon the circumstances, but will usually be between 0.005 and 5 parts for each 100 parts of rubber and in most instances between 0.25 and 2 parts. In the examples given later in this specification a quantity of 1 part of antioxidant for each 100 parts of rubber is used, and good results are obtained with the light-coloured stock described. It will be appreciated that the antioxidants of the invention can be used with dark-coloured rubber stocks also, but they are of particular value with light-coloured stocks owing to the limited number of satisfactory antioxidants available which do not discolour such stocks unduly. They are of value both with natural and synthetic rubber.

It will of course be understood that where a mixture of antioxidants is used, the constituents of the mixture may be incorporated in the rubber separately. In general, however, it will be found more convenient to mix the antioxidant constituents together before use.

The invention is illustrated by the following examples:

EXAMPLE 1

This example describes the preparation of 2:2:4-trimethyldecahydroquinoline from 2:2:4-trimethyl-1:2-dihydroquinoline, from which it can readily be obtained by hydrogenation under pressure using a nickel catalyst.

The 2:2:4-trimethyl-1:2-dihydroquinoline itself, the condensation product of acetone and aniline, can be obtained by passing acetone vapour into heated aniline in the presence of benzene sulphonic acid, and separating the product by neutralizing the reaction mixture and distilling it at reduced pressure.

600 grams of 2:2:4-trimethyl-1:2-dihydroquinoline were introduced into a steel autoclave fitted with a rocker mechanism, and a suspension of 6 grams of Raney nickel catalyst in a small amount of ethyl alcohol was added. The autoclave was closed, and the air contained in it was replaced by passing a stream of hydrogen through the autoclave. The hydrogen pressure in the autoclave was then increased to 750 pounds per square inch, and the contents of the autoclave were heated electrically to a temperature of 200° C., the autoclave being agitated by means of the rocker mechanism. The reaction was then allowed to proceed, the temperature of the reactants being maintained at 200° C. and hydrogen under pressure being admitted into the autoclave from time to time in order to maintain the pressure at 750 pounds per square inch.

After 6 hours the amount of hydrogen which had been taken up in the reaction was approximately that required to convert the 2:2:4-trimethyl-1:2-dihydroquinoline to 2:2:4-trimethyl-decahydroquinoline, that is to say 4 molecules of hydrogen for each molecule of the former. The supply of hydrogen was then cut off, the autoclave was allowed to cool to room temperature, and the reaction product was separated from the catalyst by filtration.

The reaction product consisted of 625 grams of a clear colourless liquid which was almost entirely 2:2:4-trimethyl-decahydroquinoline. This could be purified further by distillation, to give a colourless mobile liquid having a boiling point of 232° C. at a pressure of 760 mm. of mercury and a refractive index of 1.4770 at 25° C.

EXAMPLE 2

This example relates to the use as an antioxidant in natural rubber of the reaction product (almost entirely 2:2:4-trimethyl-decahydroquinoline) obtained as described in Example 1.

A rubber stock of the following composition was compounded on a laboratory mill:

| | Parts by weight |
|---|---|
| Pale crepe rubber | 100 |
| Blanc fixe | 50 |
| Zinc oxide | 5 |
| Titanium dioxide | 5 |
| Stearic acid | 1 |
| Sulphure | 2 |
| Accelerator (tetramethyl thiuram disulphide) | 0.375 |

The stock was first made up without any antioxidant, and then with 1 part by weight of the reaction product of Example 1.

Each of the two stocks was vulcanised at 126° C. for 20 minutes, and the physical properties of the vulcanised rubbers obtained were determined before ageing and:

(a) After ageing for 6 days at 70° C. in an oxygen bomb at a pressure of 300 lbs./sq. inch;

(b) After ageing for 12 days at 70° C. in a hot air oven.

The conditions of British Standard Specification No. 903/1950 were observed.

The following results were obtained:

Oxygen bomb test (i) TENSION STRENGTH (KGMS./SQ. CM.)

| | Original | After 6 days | Percentage of original figure |
|---|---|---|---|
| Stock without antioxidant | 230 | (¹) | |
| Stock with antioxidant | 251 | 149 | 59 |

(ii) PERCENTAGE ELONGATION AT BREAK

| | Original | After 6 days | Percentage of original figure |
|---|---|---|---|
| Stock without antioxidant | 685 | (¹) | |
| Stock with antioxidant | 665 | 570 | 86 |

(iii) MODULUS AT 500% ELONGATION (KGMS./SQ. CM.)

| | Original | After 6 days | Percentage of original figure |
|---|---|---|---|
| Stock without antioxidant | 98 | (¹) | |
| Stock with antioxidant | 115 | 110 | 96 |

¹ Sample melted.

Hot air oven test (i) TENSION STRENGTH (KGMS./SQ. CM.)

| | Original | After 12 days | Percentage of original figure |
|---|---|---|---|
| Stock without antioxidant | 230 | 86 | 37 |
| Stock with antioxidant | 251 | 110 | 44 |

(ii) PERCENTAGE ELONGATION AT BREAK

| | Original | After 12 days | Percentage of original figure |
|---|---|---|---|
| Stock without antioxidant | 685 | 500 | 73 |
| Stock with antioxidant | 665 | 475 | 71 |

(iii) MODULUS AT 500% ELONGATION (KGMS./SQ. CM.)

| | Original | After 12 days | Percentage of original figure |
|---|---|---|---|
| Stock without antioxidant | 98 | 90 | 92 |
| Stock with antioxidant | 115 | 120 | 104 |

In order to test any discolouring effect of the antioxidant the two vulcanised stocks were subjected to the action of ultra-violet light for a period of five hours, and their colour at the end of the period was noted, as follows:

Stock without antioxidant ____ Exceedingly pale yellow.
Stock with antioxidant _____ Very slightly more yellow.

EXAMPLE 3

The tests carried out in Example 2 were repeated using as antioxidant the same quantity (1 part by weight) of a mixture of equal parts by weight of the reaction product of Example 1 and a benzyl cresol obtained by benzylating a commercial cresylic acid containing about 60% of ortho-cresol, the remainder being largely meta- and para-cresols. It also contained a small proportion of phenol.

The benzyl cresol was prepared as follows. 250 cc. of the cresylic acid in the dry state were placed in a 500 cc. flask fitted with a reflux condenser and heated to 150° C. 50 cc. of benzyl chloride were then added slowly over a period of 30 minutes, during which time the temperature was increased to about 160° C. When all the benzyl chloride had been added the heating was discontinued, and a current of air was blown through the reaction mixture for about 30 minutes to remove residual hydrogen chloride. The product was then fractionally distilled at a pressure of 12 mm. of mercury; unreacted cresylic acid distilled at about 100° C. and the fraction distilling between 190° C. and 250° C. was collected. This was again fractionally distilled at a pressure of 12 mm. of mercury and the fraction distilling between 190° C. and 210° C. collected. This was the benzyl cresol used as antioxidant, consisting essentially of a mixture of mono-benzyl isomers and containing a little benzyl phenol.

The following results were obtained:

*Oxygen bomb test*

(i) TENSION STRENGTH (KGMS./SQ. CM.)

|  | Original | After 6 days | Percentage of original figure |
| --- | --- | --- | --- |
| Stock without antioxidant | 230 | (¹) | -- |
| Stock with antioxidant | 237 | 182 | 77 |

(ii) PERCENTAGE ELONGATION AT BREAK

|  | Original | After 6 days | Percentage of original figure |
| --- | --- | --- | --- |
| Stock without antioxidant | 685 | (¹) | -- |
| Stock with antioxidant | 660 | 570 | 86 |

(iii) MODULUS AT 500% ELONGATION (KGMS./SQ. CM.)

|  | Original | After 6 days | Percentage of original figure |
| --- | --- | --- | --- |
| Stock without antioxidant | 98 | (¹) | -- |
| Stock with antioxidant | 110 | 125 | 111 |

¹ Sample melted.

*Hot air oven test*

(i) TENSION STRENGTH (KGMS./SQ. CM.)

|  | Original | After 12 days | Percentage of original figure |
| --- | --- | --- | --- |
| Stock without antioxidant | 230 | 86 | 37 |
| Stock with antioxidant | 237 | 130 | 55 |

(ii) PERCENTAGE ELONGATION AT BREAK

|  |  |  |  |
| --- | --- | --- | --- |
| Stock without antioxidant | 685 | 500 | 73 |
| Stock with antioxidant | 660 | 520 | 79 |

(iii) MODULUS AT 500% ELONGATION (KGMS./SQ. CM.)

|  |  |  |  |
| --- | --- | --- | --- |
| Stock without antioxidant | 98 | 90 | 92 |
| Stock with antioxidant | 110 | 117 | 106 |

Once again in order to test any discolouring effect of the antioxidant the two vulcanised stocks were subjected to the action of ultra-violet light for a period of five hours, and their colour at the end of the period was noted, as follows:

Stock without antioxidant__Exceedingly pale yellow.
Stock with antioxidant_____Slightly more yellow, but still very pale.

What is claimed is:

1. A method of rendering natural rubber resistant to deterioration which comprises incorporating in said rubber as antioxidant 2:2:4-trimethyl-decahydroquinoline.
2. A method as in claim 1 in which a second rubber antioxidant is also incorporated in said rubber.
3. A method as in claim 2 in which the second rubber antioxidant is a phenolic compound.
4. A method as in claim 3 in which the phenolic compound is selected from the class consisting of a benzyl cresol, a 2:4:6-trialkyl phenol and a mono-ether of a dihydric phenol.
5. A method as in claim 3 in which the second antioxidant is a benzyl cresol.
6. A method as in claim 5 in which the benzyl cresol is obtained by benzylating a mixture of isomeric cresols.
7. A method as in claim 1 in which said rubber is subsequently vulcanized.
8. A composition of matter comprising natural rubber and 2:2:4-trimethyl-decahydroquinoline.

References Cited in the file of this patent

UNITED STATES PATENTS

| 2,074,993 | Sibley | Mar. 23, 1937 |
| 2,203,899 | Dunbrook et al. | June 11, 1940 |
| 2,500,597 | Arnold et al. | Mar. 14, 1950 |
| 2,530,774 | Kehe et al. | Nov. 21, 1950 |
| 2,582,192 | Denison | Jan. 8, 1952 |

OTHER REFERENCES

Braun et al.: "Berichte," 1924, volume 57, page 388.
Beilstein: "Hand. Org. Chem.," 2nd Suppl. (1953), page 79, vol. 20, citing Yamaguchi et al., J. Pharm. Soc., Japan (1926), Nr. 533, S. 54.